United States Patent [19]
Kolek

[11] 3,796,314
[45] Mar. 12, 1974

[54] CASTINGS FOR REVERSE OSMOSIS MEMBRANE SUPPORTS

[75] Inventor: Robert L. Kolek, Pittsburgh, Pa.

[73] Assignee: Westinghouse Electric Corporation, Pittsburgh, Pa.

[22] Filed: Apr. 17, 1972

[21] Appl. No.: 244,520

[52] U.S. Cl. .............................. 210/321, 210/496
[51] Int. Cl. ............................................ B01d 31/00
[58] Field of Search ........... 210/490, 489, 491, 500, 210/496, 321, 433; 260/37 EP

[56] References Cited
UNITED STATES PATENTS

| 3,598,241 | 8/1971 | Vondracek et al. ............... 210/321 |
| 3,361,203 | 1/1968 | Rensvold ........................ 210/496 X |

Primary Examiner—Frank A. Spear, Jr.
Attorney, Agent, or Firm—D. P. Cillo

[57] ABSTRACT

A rigid hollow porous member, having a semipermeable reverse osmosis membrane supported therein is made from filler coated with a film of resin and organo silane.

12 Claims, 2 Drawing Figures

PATENTED MAR 12 1974　　　　　　　　　　　　　　　3,796,314

CASTINGS FOR REVERSE OSMOSIS MEMBRANE SUPPORTS

BACKGROUND OF THE INVENTION

This invention relates to porous hollow vessels and to methods of manufacturing them. More particularly, this invention relates to an open pore tube made of bonded resin coated filler particles which serves as a support tube for cellulose acetate or other reverse osmosis membranes.

The major advantage of reverse osmosis as a saline or contaminated water conversion process is the low-energy requirement as compared to other processes. The function of a cell for the reverse osmosis process is to bring a saline or contaminated water solution at high pressure in contact with a supported semipermeable membrane.

There are several metals and metal combinations which can be used for the tubular-type membrane support and pressure containing components in a reverse osmosis system. These include clad carbon steels with alloys of copper and nickel or stainless steels as the cladding material. These components easily conform to the pressure requirements of such a system but the initial material cost is very expensive. Such components must be drilled with holes to permit the pure water to be removed from a saturable medium such as a fabric that is wound around the membrane forming a sump between the pipe and the membrane. This also adds to fabrication costs.

Porous fiberglass components have been used in reverse osmosis pilot plant operations successfully. Such components while strong and resistant to corrosion are, however, relatively expensive and require elaborate production equipment.

Vondracek and Calderwood in U.S. Pat. No. 3,598,241, assigned to the assignee of this invention, taught the use of bonded resin coated filler particles as a porous tubular-type membrane support module. The support modules of that invention, however, have a tendency to develop stress cracks during curing and generally require a metal casing surrounding the sand casting as an additional support during operation.

SUMMARY OF THE INVENTION

The above problems of stress cracks and wet strength retention are solved by using resin-organo silane formulation as a filler coating, and casting the coated filler to provide, upon cure, an open pore tube. This tube is especially suitable as a reverse osmosis membrane support having vastly improved wet strength properties eliminating the need of an additional support member.

BRIEF DESCRIPTION OF THE DRAWINGS

For a better understanding of the invention, reference may be made to the preferred embodiments, exemplary of the invention shown in the accompanying drawings in which.

DESCRIPTION OF THE PREFERRED EMBODIMENTS

Osmosis occurs when two solutions of different concentrations in the same solvent are separated from one another by a membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis," "pressure osmosis" and "hyperfiltration" are used to describe this process.

Figure 1:
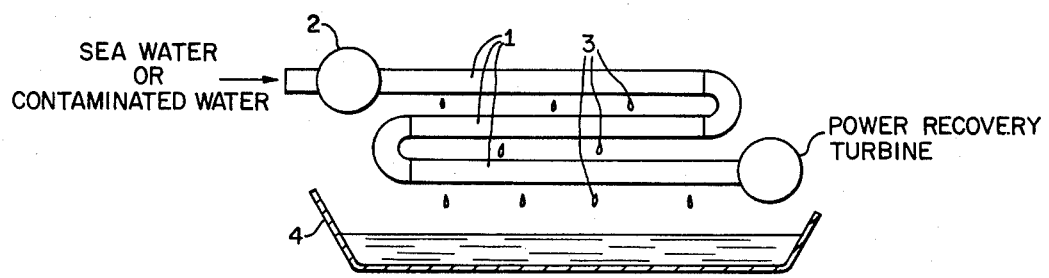
FIG. 1 is a diagram showing the principle for extracting fresh water from sea or contaminated water by a reverse osmosis liquid treatment system containing a supported membrane, feed inlet means and treated liquid outlet means.

FIG. 1 illustrates a typical tubular-type reverse osmosis liquid treatment system. Sea water or contaminated water is pumped through a battery of support tubes 1 to contact a semipermeable membrane. The pump 2 must exert a pressure of at least 10 p.s.i. and can operate at high as 1,500 p.s.i. The tubes can be mounted in batteries of about 150 each. They serve to support the reverse osmosis membrane contained within the tube wall. The membrane is usually made of an ether or ester cellulosic derivative. Generally, modified cellulose acetate is used, and reference can be made to U.S. Pat. Nos. 3,170,867; 3,310,488; 3,344,214; 3,446,359 and 3,593,855 for detailed information concerning these materials and their method of manufacture.

The tube walls that support the reverse osmosis membranes must have sufficient wet tensile, compressive and flexural strength to be able to withstand the pressure exerted on them by the pump, which is used as the means to introduce the feed liquid, and must be able to allow egress of the pure treated water 3 into a collecting pan 4. For sea water several passes through a system of this type may be required before the water is usable.

Figure 2:
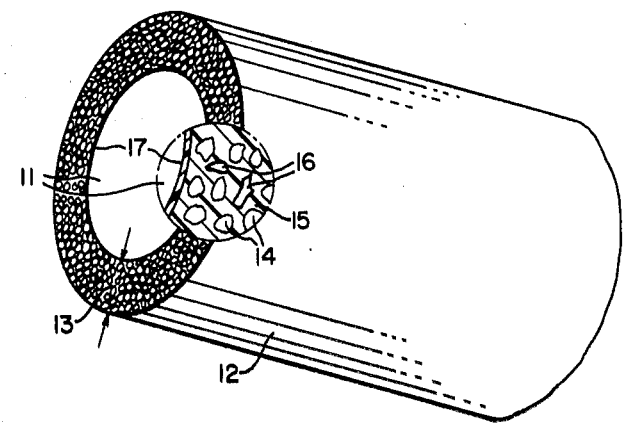
FIG. 2 is a three dimensional cross-sectional view of one embodiment of the reverse osmosis support tube of this invention, showing the membrane supported by the inside tube walls.

FIG. 2 shows one embodiment of this invention wherein the tube support 10 contains feed water passageway 11. Since the tube is made by casting techniques there is no limit to tube design. The tube wall 12 of thickness 13 comprises bonded filler 14 coated with an organic resin film 15, containing an organo silane, which bonds the filler together.

A solution containing resin, organo silane and usually an effective amount of added catalyst is coated onto the filler particles in such a way as to leave a thin, uncured film on each filler particle. Preferably a solid epoxy resin and a hot coating technique are used. The resulting particulate composition is relatively free flowing and is cast or blown into a mold of the desired configuration. The mold is then heated to cure the resin. The mold is then coiled and the casting is removed. The curing process transforms the filler-resin-organo silane-catalyst composition into a strong rigid open pore tube of bonded resin coated filler particles. This tube 10 contains voids or pores 16 between the resin coated filler particles, allowing egress of the pure water which has passed through the reverse osmosis membrane 17 supported by the inside of the tube walls. The area and number of the voids will vary inversely with the amount of resin and catalyst that is coated onto the filler particles.

On curing, the thin film of resin bonds each filler particle to the adjacent particles. It is readily seen that the amount of resin used, the size of the filler particles and the wall thickness can be adjusted to give a considerable range in the strength and porosity of the resultant tube. However, for any given filler-resin tube the strength increases with increasing resin content and the porosity decreases.

Epoxy resins are preferred as they provide the best overall strength properties. One type opoxy resin that can be used in this invention is a glycidl polyether of a dihydric phenol, obtainable by reacting epichlorhydrin with a dihydric phenol in an alkaline medium at about 50° C using 1 to 2 or more mols of epichlorhydrin per mol of dihydric phenol. The heating is continued for several hours to effect the reaction and the product is then washed free of salt and base. The product, instead of being a single compound, is generally a complex mixture of glycidyl polyethers, but the principal product may be represented by the formula:

where $n$ is an integer of the series 0, 1, 2, 3 ..., and R represents the divalent hydrocarbon radical of the dihydric phenol. Typically R is:

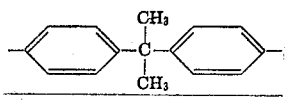

The glycidyl polyethers of a dihydric phenol used in the invention have a 1,2 epoxy equivalency between 1.0 and 2.0. By the epoxy equivalency, reference is made to the average number of 1,2 epoxy groups,

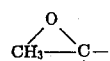

contained in the average molecule of the glycidylether. These glycidyl polyethers are commonly called bis-phenol A type (D.G.B.A.) epoxy resins. Bis-phenol A (p,p-dihydroxy-diphenyl-dimethyl methane) is the dihydric phenol used in these epoxides.

Typical epoxy resins of bis-phenol A are readily available in commercial quantities and reference may be made to the *Handbook of Epoxy Resins* by Lee and Neville for a complete description of their synthesis or to U.S. Pat. Nos.: 2,324,483; 2,444,333; 2,500,600; 2,511,913; 2,558,949; 2,582,985; 2,615,007; and 2,663,458. From a production viewpoint, solid D.G.B.A. epoxy resins having melting points between about 60°–115° C are preferred.

Other glycidylether resins that are useful and which can be used in place of or in combination with bis-phenol A type epoxides in this invention include polyglycidylethers of a novolac. The polyglycidylethers of a novolac suitable for use in accordance with this invention are prepared by reacting an epihalohydrin with phenol formaldehyde condensates. While the bis-phenol A-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of novolac.

The product of the reaction is generally a massive oxidation resistant aromatic compound, one example of which is represented by the formula:

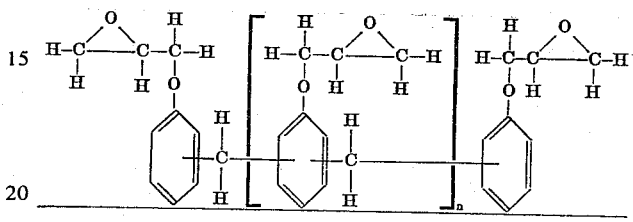

wherein $n$ is an integer of the series 0, 1, 2, 3, etc.

Although novolac resins from formaldehyde are generally preferred for use in this invention, novolac resins from other aldehydes such as, for example, acetaldehyde, chloraldehyde, butyraldehyde, fufuraldehyde, can also be used. Although the above formula shows a completely epoxidized novolac, other novolacs which are only partially epoxidized can be useful in this invention.

The glycidyl ether epoxy resins may also be characterized by reference to their epoxy equivalent weight, which is the means molecular weight of the particular resin divided by the mean number of epoxy radicals per molecule. In the present invention, the suitable epoxy resins are characterized by an epoxy equivalent weight of from about 150 to about 2,500 for the bis-phenol A type and from about 100 to 500 for the epoxy novolacs. Within this range there is a preferred range of epoxy equivalent weight of from about 160 to about 1,200 for the bis-phenol A type, characterizing the solid D.G.B.A. types, and from about 125 to 250 for the epoxy novolacs. These two types of epoxy resins may be used alone or in admixtures.

Non-glycidyl ether epoxides may also be used in place of or in combination with bis-phenol A type epoxides in this invention. These are selected from cycloaliphatic and acyclic aliphatic type epoxides. These non-glycidyl ether epoxides are generally prepared by epoxidizing unsaturated aliphatic or unsaturated aromatic hydrocarbon compounds, such as olefins and cyclo-olefins, using hydrogen peroxide or peracids such as peracetic acid and perbenzoic acid:

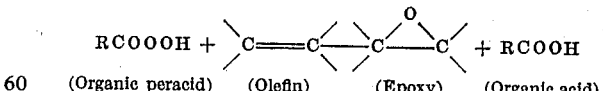
(Organic peracid)  (Olefin)  (Epoxy)  (Organic acid)

The organic peracids are generally prepared by reacting hydrogen peroxide with either carboxylic acids, acid chlorides or ketones to give the compound R—COOOH.

Such non-glycidyl ether epoxides are characterized by the absence of the ether oxygen near to the epoxide group and are selected from those which contain a ring structure as well as an epoxide group in the molecule, the cycloaliphatic epoxides; and those which have an essentially linear structure onto which are attached epoxide groups, the acyclic aliphatic epoxides.

Examples of cycloaliphatic epoxides would include 3,4-epoxycyclohexymethyl-3,4,-epoxy cyclohexane carboxylate; vinyl cyclohexane dioxide; 3,4-epoxy - 6 - methycyclohexyl methyl - 3,4-epoxy - 6 - methylcyclohexane carboxylate and dicyclopentadiene dioxide.

The cycloaliphatic epoxides are normally epoxides produced by the peroxidation of cyclic olefins. A distinguishing feature of many of the non-glycidyl ether cycloaliphatic epoxides is the location of the epoxy group(s) on a ring structure rather than on an aliphatic side chain.

Examples of acyclic aliphatic epoxides would include epoxidized diene polymers, epoxidized polyesters and epoxidized naturally occurring fatty acid oils.

These non-glycidyl ether epoxides may be characterized by reference to their epoxy equivalent weight, which is defined as the weight of epoxide in grams which contains one gram equivalent of epoxy. In the present invention, the suitable non-glycidyl ether epoxides are characterized by an epoxy equivalent weight of from about 75 to 250 for the cycloaliphatic type, and from about 250 to 600 for the acyclic aliphatic type.

Solvents which have been found to be suitable for the epoxy resins used in this invention comprise, in general, alcohols, such as methanol, ethanol, propanol, isopropanol, and the like; ketones such as methyl isobutyl ketone and acetone, aromatic hydrocarbons such as xylene, toluene, benzene, and the like, and the normally liquid organic solvents of the N, N-dialkylcarboxylamide class such as dimethylacetamide and the like.

The resins are curable to a solid state by heating them to their curing temperature in the presence of an effective amount of suitable polymerization catalyst. Examples of such catalysts would include, for example, dicyandiamide, triethanolamine borate, boron trifluoride monoethylamine, metaphenylenediamine, diphenylamine, melamine, quinoline, hexamethylenetetramine, methylene dianiline, methyl imidazole, diamino diphenyl sulfone, urea, and substituted ureas such as alkyl ureas an example being tetraethyl urea, and guanidines.

Phenolic resins can also be used in this invention. They are thoroughly discussed in Megson, *Phenolic Resin Chemistry*, Academic Press, 1958. They are conventionally obtained by reacting a phenolic substance such as phenol itself or substituted phenols such as cresols, xylenols, or butyl phenol with an aldehyde such as formaldehyde, propionaldehyde, acetaldehyde, benzaldehyde or furfural. The characteristics of the materials formed by the reaction of phenols with aldehydes can be varied widely by choice and ratio of reactants and by such reaction conditions as acidity, alkalinity, temperature, time, catalysts or accelerators and presence and nature of solvent or diluent.

One-step phenolic resins (resols) are made with basic catalysts such as inorganic hydroxides, quaternary ammonium hydroxides, or tertiary amines. This type of resin has at least one mol of formaldehyde per mol of phenol. The first part of the reaction is the addition of the formaldehyde to the phenol to form a phenol alcohol or methylol phenol. The second part of the reaction is condensation polymerization wherein the initially water soluble product is transformed into a resin of increasing molecular weight and decreasing water tolerance. Curing of one-step resins occurs by the further condensation of residual methylol groups to yield an insoluble, infusible network structure.

Two-step phenolic resins (novolacs) are obtained with acidic catalysts and less than one mol of formaldehyde per mol of phenol. In the acid catalyzed reaction, although methylols are formed as intermediates, they are immediately, under the influence of the acid, converted to methylene links. These resins are characterized by requiring additional formaldehyde or some cross-linking agent such as hexamethylenetetramine to cure.

Other resins well known in the art which may be used as the coating and bonding agent in this invention include: polyesters (see Bjorksten, *Polyesters And Their Applications*, Reinhold Publishing Corporation, 1956, pages 1–34), and melamine formaldehyde resins (see Brydson, *Plastic Materials*, D. Van Nostrand Company, 1966, chapter 20.3).

The finely divided filler used in accordance with this invention may be spherical, oval, cubical, or of other irregular configuration. Some examples of suitable inorganic filler particles are sand, zircon, quartz, beryl, talc, glass, limestone, calcium silicate, alumina, or any other filler with granular structure. Lightweight fillers such as hollow spherical glass beads, vermiculite, expanded perlite, and ground pumice stone can also be used. The preferred average particle size range is between 50 and 250 microns although the outer limits are between about 40 and 500 microns. Below 40 microns the resin-filler support tube lacks the desired porosity for low resistance to water flow and above 500 microns the tube does not properly support the membrane.

The weight percent resin that can be used in this invention will vary from about 1 to 18 weight percent of the coated filler particle weight. When sand is used as the filler the range will vary from about 2 to 10 weight percent. On a volume basis the range would be about 4 to 32 percent resin for the fillers enumerated. Above these ranges the resin will tend to clog up the pores between the filler particles in the tube causing poor effusion of the pure water. Below these ranges the support tube will not be strong enough for the pressures required in this water purification process.

The organo silanes that are suitable for use in this invention and which provide the wet strength necessary for the sand casting to withstand in service pressure stresses are organo-functional silanes selected from the group consisting of vinyl silanes such as, for example, vinyltrichlorosilane ($CH_2 = CHSiCl_3$), vinyltriethoxysilane ($CH_2 = CHSi(OC_2H_5)_3$), and vinyl-tris-(beta-methoxethoxy) silane ($CH_2 = CHSi(OC_2H_4OCH_3)_3$), aminoalkylsilanes such as, for example, gamma-aminopropyltriethoxysilane ($H_2NCH_2CH_2CH_2Si(OC_2H_5)_3$) and N-beta-(aminoethyl) gamma-amino-propyltrimethoxysilane ($H_2N(CH_2)_2HN(CH_2)_3Si(OCH_3)_3$) and epoxyalkylsilane esters such as alicyclic and acyclic oxiranes, for example cyclic epoxy silane beta-(3,4,-epoxy cyclohexyl) ethyltrimethoxysilane

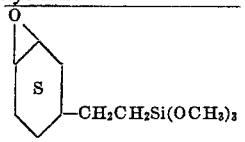

and aliphatic epoxysilane gamma-glycidoxypropyl-trimethoxy-silane

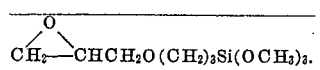

The weight percent organo silane that can be used in this invention will vary from about 0.2 to 1.5 weight percent of the coated filler particle weight. Above this range no improvement in wet strength retention is obtained. Below this range maximum wet strength retention is not developed. All of these silanes work well with epoxy resins. The vinyl silanes are preferred with polyester resins and aminoalkylsilanes are preferred with the polyester and melamine-formaldehyde resins.

Other materials can be used in the resin-organo silane-sand system, besides effective amounts of polymerization catalysts include, effective amounts of diluents to reduce the viscosity of the resins and effective amounts of waves, such as for example, Montan Wax, Besamide Wax or other release agents such as calcium stearate to provide smooth surface finish and good release of the sand casting from its production mold.

EXAMPLE I

Ten reverse osmosis membrane support tubes, along with cylinders and other test specimens were made using different epoxy resin bonded sand samples.

SAMPLE A

To 11,350 grams of washed dry round sand having an average particle size of 177 microns was added 113 grams of beta-(3,4-epoxycyclohexy)ethyltrimethoxysilane (sold commercially by Union Carbide under the tradename Amino Silane A-186) and 57 grams of powdered Montan Wax. This was mixed for 1 minute in a Hobart dough-type planetary mixer. Then a mixture containing 27 grams of boron trifluoride-monoethylamine catalyst and 454 grams of solid diglycidyl ether of bis-phenol A resin having an Epoxy Equivalent Weight of 875–1,025 and a Durran's melting point of 95°–105° C (sold commercially by Shell Chemical Co. under the tradename Epon 1004 Epoxy Resin), was added to provide a resin sand casting composition which was mixed for about 2 minutes until it was free flowing.

The casting composition sample was poured into a 4 feet cylindrical mold which contained 18 axial tubes symmetrically placed. Filling was performed on a vibrating table to facilitate packing and flow. The filled mold was then heated at atmospheric pressure for 12 hours at 177° C to cure the composition. The mold was then stripped and a rigid porous cast module of organo silane-epoxy resin coated sand particles containing 18 axial holes was obtained. It contained about 4 weight percent actual resin and about 0.9 weight percent organo silane. Dog bone and square bar specimens, along with a variety of solid cylinders where also cast from this composition for testing purposes using the same curing schedule.

SAMPLE A1

Control Sample A1 was mixed using the same casting composition as Sample A but without any organo silane. A rigid porous module of epoxy resin coated sand particles was cast and cured similarly to Sample A, as were dog bone, square bar and solid test cylinders.

SAMPLE B

To 11,350 grams of washed dry round sand having an average particle size of 177 microns was added 113 grams of beta-(3,4-Epoxycyclohexyl) ethyltrimethoxy silane (sold commercially by Union Carbide under the tradename Amino Silane A-186) and 57 grams of powdered Montan Wax. This was mixed for a total of 1 minute in a Hobart dough-type planetary mixer. Then a mixture containing 27 grams of boron trifluoride-monoethylamine catalyst and 454 grams of a liquid diglycidyl ether of bis-phenol A resin having an Epoxy Equivalent Weight of 185–192 and a viscosity at 25° C of 10,000–16,000 cps. diluted with 11% butyl glycidyl ether diluent (sold commercially by Shell Chem. Co. under the tradename Epon 815 Epoxy Resin) was added to provide a resin coated sand casting composition which was mixed for 2 minutes until all the sand was uniformly wet. This composition exhibited excellent lubricity.

The casting composition sample was blown at 50 psi into a 4 feet cylindrical mold which contains 18 axial tubes symmetrically placed. The filled mold was then heated at atmospheric pressure for 12 hours at 177° C to cure the composition. The mold was then stripped and a rigid porous cast module of organo silane-epoxy resin coated sand particles containing 18 axial holes was obtained. It contained about 4 weight percent actual resin and about 0.9 weight percent organo silane. Dog bone and square bar specimens along with a variety of solid cylinders were also cast from this composition for testing purposes using the same curing schedule.

SAMPLE B1

Sample B1 was mixed using the same casting composition as Sample B, except that an equal amount of gamma-aminopropyltriethoxysilane (sold commercially by Union Carbide under the tradename Amino Silane A-1100) was substituted for the Amino Silane A-186 of Sample B.

A rigid porous module of organo-silane-epoxy resin coated sand particles was cast and cured similarly to Sample B, as were dog bone, square bar and solid test cylinders.

SAMPLE B2

Control Sample B2 was mixed using the same casting composition as Sample B but without any organo silane. A rigid porous module of epoxy resin coated sand particles was cast and cured similarly to Sample B, as were dog bone, square bar and solid test cylinders.

SAMPLE C

To 11,350 grams of washed dry round sand having an average particle size of 177 microns was added 113 grams of beta-(3,4-epoxy cyclohexyl) ethyl trimethoxy silane and 57 grams of Montan Wax. This was mixed for a total of 1 minute in a Hobart dough-type planetary mixer. Then a mixer containing 27 grams of boron trifluoride-monoethylamine catalyst and 454 grams of a liquid cyclic aliphatic epoxy, 3,4-epoxycyclohexyl methyl-3,4-epoxy cyclohexane carboxylate having an Epoxy Equivalent Weight of 140 and a viscosity at 25° C of 350 cps. (sold commercially by Ciba Prod. Co. under that tradename CY-179 Epoxy Resin) was added to provide a resin coated sand casting composition which was mixed for about 2 minutes until all the sand was uniformly wet. This composition was not tacky and exhibited good lubricity.

The casting composition sample was blown at 50 psi. into a 4 foot cylindrical mold which contained 18 axial tubes symmetrically placed. The filled mold was then heated at atmospheric pressure for 8 hours at 149° C to cure the composition. The mold was then stripped and a rigid porous cast module of organo silane-epoxy resin coated sand particles containing 18 axial holes was obtained. It contained about 4 weight percent actual resin and about 0.9 weight percent organo silane. Dog bone and square bar specimens, along with a variety of solid cylinders were also cast from this composition, for testing purposes, using the same curing schedule.

SAMPLE C1

Control Sample C1 was mixed using the same casting composition as Sample C but without any organo silane. As rigid porous module of epoxy resin coated sand particles was cast and cured similarly to Sample C, as were dog bone, square bar and solid test cylinders.

SAMPLE D

To 11,350 grams of washed dry round sand having an average particle size of 177 microns was added 113 grams of beta-(3,4-Epoxy cyclohexyl) ethyl trimethoxy silane and 57 grams of Montan Wax. This was mixed for a total of 1 minute in a Hobart dough-type planetary mixture. Then, a mixture containing 27 grams of boron trifluoride-monoethylamine catalyst, 454 grams of a liquid diglycidyl ether of bisphenol A resin having an Epoxy Equivalent Weight of 182–189 and a viscosity at 25° C of 7,000–10,000 cps. (sold commercially by Dow Chemical Co. under the tradename DER 330 Epoxy Resin) and 227 grams of 1,4-butanediol digylcidyl ether diluent, having an Epoxy Equivalent Weight of 136 and a viscosity at 25° C of 19 cps. was added to provide a resin coated sand casting composition which was mixed for about 2 minutes until all the sand was uniformly wet. This composition was not too tacky and exhibited good lubricity.

The casting composition sample was blown at 50 psi. into a 4 foot cylindrical mold which contained 18 axial tubes symmetrically placed. The filled mold was then heated at atmospheric pressure for 12 hours at 177° C to cure the composition. The mold was then stripped and a rigid porous cast module of organo silane-epoxy resin coated sand particles containing 18 axial holes was obtained. It contained about 6 weight percent actual resin and about 0.9 weight percent organo silane. Dog bone and square bar specimens, along with a variety of solid cylinders were also cast from this composition for testing purposes, using the same curing schedule.

SAMPLE E

To 1,500 grams of washed dry round sand having an average particle size of 177 microns was added 7.5 grams of beta-(3,4-Epoxy cyclohexyl) ethyl trimethoxy silane and 15 grams of powdered Montan Wax. This was mixed for 1 minute in a Hobart dough-type planetary mixer. Then a mixture containing 12 grams of powdered methylene dianiline catalyst and 100 grams of a solid diglycidyl ether of bis-phenol A resin having an Epoxy Equivalent Weight of 475–575 and a Durran's melting point of 70°–80° C (sold commercially by Dow Chemical Co. under the tradename DER 661 Epoxy Resin) was added to provide a resin sand casting composition which was mixed for about 2 minutes. It was free flowing but slightly tacky.

The casting composition sample was poured into a 4 foot cylindrical mold which contained 18 axial tubes symmetrically placed. Filling was performed on a vibrating table to facilitate packing and flow. The filled mold was then heated at atmospheric pressure for 12 hours at 177° C to cure the composition. The mold was then stripped and a rigid porous cast module of organo silane-epoxy resin coated sand particles containing 18 axial holes was obtained. It contained about 6 weight percent actual resin and about 0.5 weight percent organo silane. Square bar specimens along with a variety of solid cylinders were also cast from this composition, for testing purposes, using the same curing schedule.

SAMPLE F

To 3,000 grams of washed dry round sand having an average particle size of 177 microns was added 7.5 grams of beta(3,4-epoxy cyclohexyl) ethyltrimethoxysilane in a Balo Mixer, heated to 130° C by an overhead infrared heater connected to a Variac. The sand and silane were mixed for about 1 minute and then 12 grams of flaked methylene dianiline was added and mixed for about 2 minutes until no flakes were visible. Then a resin consisting of 100 grams of a solid diglycidyl ether of bis-phenol A resin, having an Epoxy Equivalent Weight of 475–575 and a Durran's melting point of 70°–80° C (DER 661 Epoxy Resin), in solution with methyl isobutyl ketone was added and mixed for about 5 minutes. Then 15 grams of Bisamide Wax was added and mixed for about 2 minutes. The coated sand was dropped from the mixer onto a 40 mesh screen and sieved.

The casting composition was poured into a 1½ inch cylindrical mold which was 22 inches long. The filled mold was then heated at atmospheric pressure for 4 hours at 300° C to cure the composition. The mold was then stripped and a rigid porous cast cylinder of organo silane-epoxy resin coated sand particles was obtained. It contained about 3 weight percent resin and about 0.3 weight percent silane. Dog bone and square bar specimens were also cast from this composition for testing purposes, using the same curing schedule.

EXAMPLE 2

For comparative purposes two membrane support tubes 4 feet long and 4 inches in diameter were made of phenolic resin bonded sand, each containing 18 axial holes.

SAMPLE G

In this Example, 11,350 grams of sand, having an average particle size of about 177 microns, coated with phenolic resin was used. (Sold commercially by Artisand Inc. under the tradename Artisand). The dry resin coated sand was poured into a 4 foot cylindrical mold which contained 18 axial tubes symmetrically placed. Filling was performed on a vibrating table to facilitate packing and flow. The filled mold was then heated at atmospheric pressure for 24 hours at 204° C to cure the composition. The mold was then stripped and a rigid porous cast module of resin coated sand particles containing 18 axial holes was obtained. It contained about 4 weight percent resin. This is an example of a prior art sand module. Dog bone and square bar specimens along with a variety of solid cylinders were also cast from this composition, for testing purposes, using the same curing schedule.

SAMPLE H

Similarly, to Sample G, Control Sample H containing 11,350 grams of sand having an average particle size of about 177 microns coated with phenolic resin was used. (Sold commercially by Holly City Sand Co. under the tradename Accurez Coated Sand.)

The dry mixture was poured into the mold and cured for 12 hours at 204° C. It contained about 4 weight percent resin. Dog bone, square bar and solid test cylinders were also made from the mixture.

strength tests were run on the cured Sample casting compositions under both dry and wet conditions along with permeability measurements.

Tensile strength measurements were American Foundation Society No. 612 on standard foundry dog bone specimens cast from the above Sample casting compositions. Compressive strength measurements were on 2 inches long, 2 inches diameter solid cylinders cast from the above Sample casting compositions. The wet strength of the Sample specimens was obtained after a two hour water boil. The Samples were allowed to cool in water until tested.

Water permeability testing was conducted on 3 inches diameter solid cylinders, cast from the above Sample casting compositions. These were 4 inches long with a ½ inch hole bored through the center. The cylinder was mounted in a holder which sealed the ends of the cylinder and allowed water to fill the center hole at a pressure of 150 mm Hg. The weight in grams of water per minute which permeated through the wall of the cylinder was measured and reported. These tests were run on the Sample casting compositions A, A1, B, B1, B2, C, C1, D, E, F, G and H which were cast, cured and tested under similar conditions. The comparative results are shown in Table 1 below:

TABLE 1

Effect of Silane on the Physical Properties of Casting Compositions

| Casting Composition | Dry Strength (psi) | | | Wet Strength (psi) After Water Immersion | | | % Wet Strength Retention | | | Permeability (gms H$_2$O/min) |
|---|---|---|---|---|---|---|---|---|---|---|
| | Tensile | Compressive | Flexural | Tensile | Compressive | Flexural | Tensile | Compressive | Flexural | |
| Sample A (solid DGBA epoxy + silane) | 501 | 3460 | 1458 | 208 | 2454 | 728 | 41 | 71 | 50 | 3500 |
| Sample A1 (solid DGBA epoxy, no silane) | 501 | 3460 | 1458 | 243 | 1651 | 898 | 48 | 47 | 61 | 3561 |
| Sample B (liquid DGBA epoxy + silane) | 678 | 3323 | 1216 | 471 | 2850 | 440 | 70 | 86 | 36 | 3624 |
| Sample B1 (liquid DGBA epoxy + silane) | 678 | 3323 | 1216 | 266 | 2656 | 815 | 39 | 80 | 67 | 3991 |
| Sample B2 (liquid DGBA epoxy, no silane) | 678 | 3323 | 1216 | 142 | 1815 | 441 | 20 | 54 | 36 | 3658 |
| Sample C (liquid non-glycidyl ether epoxy + silane) | 479 | 2406 | 966 | 431 | 3650 | 680 | 90 | 100 | 70 | 3500 |
| Sample C1 (liquid non-glycidyl ether epoxy, no silane) | 479 | 2406 | 966 | 278 | 1795 | 410 | 58 | 74 | 42 | 4567 |
| Sample D (liquid DGBA epoxy + silane | 678 | 3323 | 1216 | — | — | — | — | — | — | 4116 |
| Sample E (solid DGBA epoxy + silane) | — | 2880 | 1000 | — | — | 800 | — | — | 80 | — |
| Sample F (solid DGBA epoxy + silane) | — | 3200 | 2200 | — | — | 1760 | — | — | 80 | — |
| Sample G (liquid phenolic, no silane) | 171 | 1190 | 433 | 10 | 120 | 52 | 5 | 10 | 11 | 3636 |
| Sample H (liquid phenolic, no silane) | 330 | 1377 | 1143 | 128 | 1205 | 236 | 39 | 87 | 20 | 3582 |

Tubular porous reverse osmosis membranes made from about 23 wt. percent cellulose acetate, 47 wt. percent acetone solvent and 30 wt. percent formamide pore producing agent were cast into the axial water passage bores of the module of Sample F, to provide a porous reverse osmosis module.

Tensile strength, compressive strength, and flexural

The four Sample compositions containing silanes (Samples A, B, B1 and C) had average percent wet strength retention of tensile = 60 percent; compressive = 84 percent; flexural = 56 percent and samples E and F had 80 percent wet flexural strength retention whereas the five Sample compositions not containing silanes (Samples A1, B2, C1, F and G) had average percent wet strength retention of tensile = 34 percent; compressive — 54 percent; flexural = 34 percent. The three Epoxy Sample compositions not containing silanes (Samples A1, B2, and C1) had average percent wet strength retention of tensile = 42 percent; compressive = 58 percent and flexural = 45 percent. The results indicate the superiority of casting compositions containing silanes over those not containing silanes in terms of percent wet strength retention, and show that the silane coupling agents provide the wet strength necessary for the reverse osmosis sand module casting to withstand in-service operating pressure stresses and possibly eliminate the need of expensive reinforcing material for the module such as a stainless steel shell.

I claim:

1. A rigid open pore reverse osmosis membrane support tube having a wall containing bonded, resin-organo silane coated filler, wherein the resin constitutes about 1 to 18 weight percent of the resin-silane coated filler weight, the organo silane constitutes about 0.2 to 1.5 weight percent of the resin-silane coated filler weight, the filler comprises particles having a granular structure and an average particle size between about 40 and 500 microns, the inside of said wall having a smooth surface and a reverse osmosis membrane supported inside the wall.

2. The tube of claim 1 wherein the organo silane is selected from the group consisting of vinyl silanes, aminoalkylsilanes and epoxyalkylsilane esters.

3. The tube of claim 2 wherein the reverse osmosis membrane is selected from the group consisting of ether and ester cellulosic derivatives.

4. The tube of claim 3 containing axial holes therein, the tube also containing effective amounts of release agent, the membrane being a cast in place cellulose acetate membrane supported inside said axial holes, the filler is sand having an average particle size between about 50 and 250 microns, the resin constitutes about 2 to 10 percent of the resin-silane coated filler particle weight, and the tube is surrounded by a metal casing.

5. In combination, a rigid porous reverse osmosis membrane support member having a smooth surface and a semipermeable reverse osmosis membrane supported by said porous member, the porous member comprising inorganic particles having an average particle size between about 40 and 500 microns and having a resinous film deposited thereon, said resinous film containing about 0.2 to 1.5 weight percent organo silane, based on the weight of the member, the resin in said resinous film constituting about 4 to 32 volume percent of the porous member and bonding adjacent inorganic particles to form said rigid porous member.

6. The porous member of claim 5 wherein the organo silane is selected from the group consisting of vinyl silanes, aminoalkylsilanes and epoxyalkylsilane esters.

7. The porous member of claim 6 wherein the reverse osmosis membrane is selected from the group consisting of ether and ester cellulosic derivatives, and the resin is selected from the group consisting of epoxy phenolic, polyester and melamine-formaldehyde resins.

8. The porous member of claim 7 wherein the organo silane is an epoxy alkylsilane ester selected from the group consisting of cyclic epoxy silanes and aliphatic epoxy silanes and the resin is a solid diglycidyl ether of bisphenol A epoxy resin having an epoxy equivalent weight between about 160–1,200 and a melting point between about 60°–115° C.

9. A reverse osmosis liquid treatment system comprising a supported semipermeable reverse osmosis membrane, said support comprising a rigid porous reverse osmosis membrane support member comprising bonded filler having an average particle size between about 40 and 500 microns coated with a film comprising resin and organo silane, said film containing about 1 to 18 weight percent resin and 0.2 to 1.5 weight percent organo silane based on resin-silane coated filler weight, means for introducing liquid into the system to contact the membrane under pressure and outlet means for the treated liquid.

10. The reverse osmosis liquid treatment system of claim 9, wherein the porous member is an open pore tube containing axial holes having a smooth surface, the membrane being supported inside said axial holes.

11. The reverse osmosis liquid treatment system of claim 10, wherein the porous member also contains effective amounts of release agent, the membrane is cast in place inside the axial holes, the filler has a granular structure and an average particle size between about 50 and 250 microns, and the tube is surrounded by a metal casing.

12. The reverse osmosis liquid treatment system of claim 11 wherein the membrane is cellulose acetate and the filler is sand.

* * * * *